UNITED STATES PATENT OFFICE.

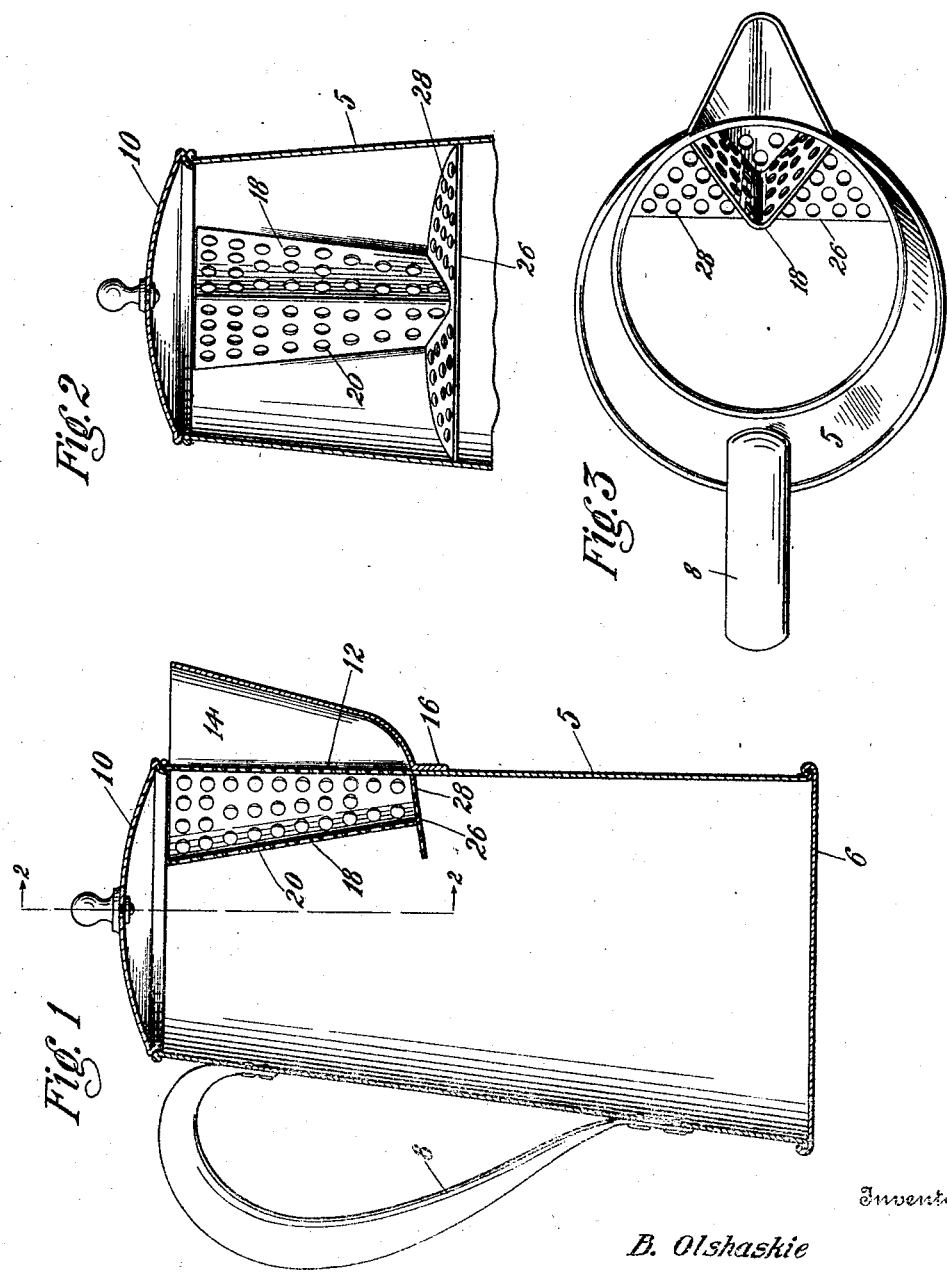

BENJAMIN OLSHASKIE, OF PANA, ILLINOIS.

COFFEEPOT.

1,394,040. Specification of Letters Patent. Patented Oct. 18, 1921.

Application filed July 12, 1920. Serial No. 395,484.

*To all whom it may concern:*

Be it known that I, BENJAMIN OLSHASKIE, citizen of the United States, residing at Pana, in the county of Christian and State of Illinois, have invented certain new and useful Improvements in Coffeepots, of which the following is a specification.

This invention relates to improvements in receptacles and more particularly to coffee pots.

One of the principal aims of this invention is to provide a coffee pot having simple means to prevent the coffee grains from being discharged from the pot when the latter is tilted for the purpose of pouring the coffee.

A further object of the invention is to provide a coffee pot having reliable means for preventing the coffee grains within the pot from clogging up the discharge spout when the pot is tilted to its discharging position.

A further object of this invention is to provide a coffee pot of the class described which is neat in appearance, desirable in use, and cheap to manufacture.

Other objects and advantages of the invention will be apparent during the course of the following description.

In the accompanying drawing, forming a part of this application, and in which like numerals are employed to designate like parts throughout the same:

Figure 1 is a central vertical sectional view through a coffee pot embodying the invention, Fig. 2 is a vertical detail sectional view taken on line 2—2 of Fig. 1, Fig. 3 is a plan view of the improved coffee pot, the cover thereof being removed.

In the drawing, wherein for the purpose of illustration is shown a preferred embodiment of the invention, the numeral 5 generally designates the body of the receptacle which as usual, is provided with a flat bottom 6. The body 5 is provided with a handle 8 and a cover 10 which may be entirely detachable or hinged to the upper end of the body.

With particular reference to Fig. 1, it will be observed that the upper portion of the body 5 is provided in one side with a plurality of perforations or apertures 12 which allow the coffee from the pot to enter a discharge spout 14. The spout 14 may be secured to the side of the receptacle in any suitable manner as by flanges 16 or the like.

The body 5 is provided interiorly with a strainer 18 arranged inwardly of the spout 14 and apertures 12 and terminating adjacent the upper end of the body. The strainer 18, which is V-shaped in cross section, is provided with a plurality of apertures or perforations 20 throughout its area. The coffee pot is provided directly beneath the strainer 20 with a baffle plate 26 which is segmental in formation and extends beyond the sides of the strainer 18 and is secured to the inner side of the body by solder or any other suitable means. The baffle plate 26 is provided with a plurality of perforations 28 which provide a means whereby the liquid may pass into the spout 14. The baffle 26 prevents the coffee grains from movement to the upper portion of the coffee pot and clogging up the perforations in the strainer 18. As the baffle 26 is inclined transversely, the coffee grains are trapped when the coffee pot is tilted and are, therefore, prevented from moving to the upper portion of the pot. Further, the inner or free edge of the baffle 26 projects beyond the apex or ridge of the strainer 18 so that the grains of coffee or the like are absolutely prevented from passing to the upper portion of the pot when the latter is tilted.

As illustrated in Fig. 1, the strainer 18 is gradually and uniformly enlarged in the direction of its upper end and is open so that the same may be conveniently cleaned. Also, by gradually and uniformly enlarging the strainer, the sides of the same are tilted so that any grains which may contact with the strainer will drop to the bottom of the pot when the pot is arranged in an upright position, as illustrated in Fig. 1.

In the use of the invention, it will be found that the coffee discharged through the spout 14 will be absolutely free of all coffee grains and that the coffee grains will not in any way be allowed to retard the flow of coffee due to the fact that the grains are spaced from the strainer 18 and the perforations 12.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed as new is:

1. A receptacle of the class described comprising a body, a discharge spout connected thereto, said body being provided with perforations in one side wall thereof whereby communication is established between said spout and body, a perforated strainer secured to said body and being V-shaped in cross section, and a perforated baffle secured flatly in contact with the entire lower end of the strainer and extending beyond the sides of the same, the enlarged upper end of the strainer being open to permit cleaning.

2. In a receptacle for beverages provided with a spout, a perforated strainer integral therewith, said strainer having the shape of an inverted frustum open at its large end, two sides of the strainer being flat and the third side forming part of the wall of the receptacle bound by said spout, the bottom of the strainer covering the small end of said frustum and having side wings extending beyond said flat sides across the receptacle and said bottom being inclined inwardly and downwardly as regards the base of the receptacle.

In testimony whereof I affix my signature.

BENJAMIN OLSHASKIE. [L. S.]